United States Patent [19]

Tange

[11] 4,404,458

[45] Sep. 13, 1983

[54] ATTACHMENT OF FORK FITTING TO FORK LEG

[75] Inventor: Yasuhiro Tange, Sakai, Japan

[73] Assignee: Tange Industries, Ltd., Osaka, Japan

[21] Appl. No.: 279,261

[22] Filed: Jul. 1, 1981

[30] Foreign Application Priority Data

Jul. 7, 1980 [JP] Japan ................................. 55-93683

[51] Int. Cl.³ ........................ B23P 13/00; B21J 5/08
[52] U.S. Cl. ................................ 219/150 R; 219/104;
219/105; 219/149; 228/173 F
[58] Field of Search .............. 219/104, 105, 107, 67,
219/149, 150 R, 93; 228/173 F

[56] References Cited

U.S. PATENT DOCUMENTS 1,898,814  2/1933  Charlton ........................ 219/93 X
2,021,157 11/1935  Stahl .............................. 219/93 X
2,127,685  8/1938  Greulich ........................ 219/93 X
2,455,057 11/1948  Hart ............................. 219/107 X
3,689,969  9/1972  Tsunoda ..................... 219/150 R X Primary Examiner—B. A. Reynolds
Assistant Examiner—Catherine Sigda
Attorney, Agent, or Firm—Cantor and Lessler

[57] ABSTRACT

A method for attaching a bicycle fork fitting to a fork leg is disclosed, using a particular fork fitting means. A steel pipe is formed with a fork leg including its one closed distal end with a joint. The fitting means is provided with projections at the portions near to both ends of the side thereof to be welded. Electric currents are passed through the closed portion of the fork leg and the projections of the fitting which are brought in contact with each other under pressure. Upon reaching a temperature suitable for welding, the thus integrated arrangement is upset under greater pressure, so that the fitting is welded to the fork leg.

4 Claims, 14 Drawing Figures

FIG. 1B    FIG. 1A
 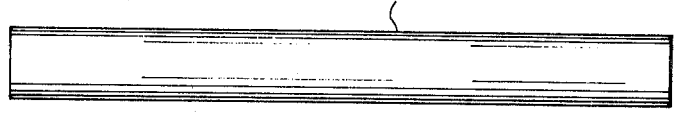
FIG. 2B    FIG. 2A
 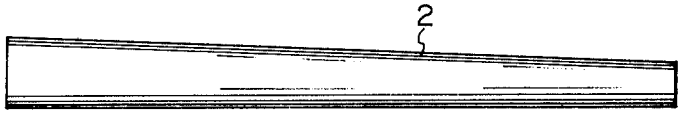
FIG. 3B    FIG. 3A
 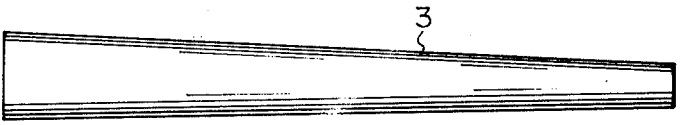
FIG. 4A      FIG. 4B
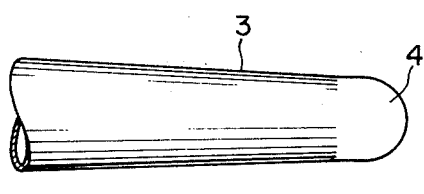 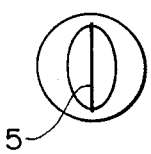
FIG. 5
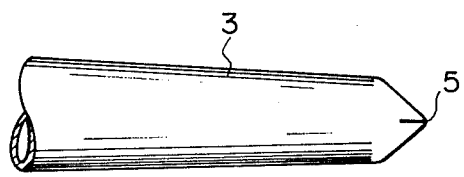

ATTACHMENT OF FORK FITTING TO FORK LEG

BACKGROUND OF THE INVENTION

The present invention relates to a method for attaching a bicycle fork fitting to a fork leg.

Heretofore, the attachment of a front or rear fitting to a front fork leg or back fork has been carried out by means of brazing. For instance, this has comprised the steps of previously forming a fitting with an inserting leg piece, pressing out the distal end of a swaged and elliptically collapsed fork leg into a semi-circular shape by a pressing machine, providing a small notch to a joint of the thus closed end, cutting the notched joint by a milling machine to form a groove for insertion of the fitting followed by deburring, inserting the fitting's leg piece into the groove by a specially devised inserter followed by flux treatment, and brazing the thus constructed arrangement with the application of gas heating, using a brazing machine.

However, the prior art method needs to form the fitting with a leg piece, and necessarily involves some laborious steps such as, for instance, grooving of the distal end of the fork leg, deburring, insertion of the fitting, flux treatment, brazing and the like. This invevitably leads to difficulties encountered in cost reduction, mass-production and energy saving. In some cases, a lowering of the strength of material may be caused by brazing effected at about 900° C.

SUMMARY OF THE INVENTION

The present invention aims at eliminating the above-mentioned demerits.

A main object of the present invention is therefore to provide a method for attaching a fork fitting to a fork leg, which dispenses with the steps of forming a fitting with a leg piece as well as troublesome grooving, deburring, fitting-inserting, flux-treating, brazing and the like steps and can therefore save cost, labor and energy, and which prevents a lowering of the strength of material due to heating and provides a product of uniform quality.

According to the present invention, this is achieved by a method for attaching a fork fitting to a fork leg comprising the steps of forming a steel pipe with a fork leg, closing the distal end of the pipe with a joint by shearing, providing a fitting with projections at the portions near to both ends of the sides thereof to be welded, passing electric currents through the closed portion of the fork leg and the projections of the fitting which are brought in contact with each other under pressure, and upsetting under greater pressure the thus integrated arrangement upon reaching a temperature suitable for welding, whereby the fitting is welded to the fork leg.

BRIEF DESCRIPTION OF THE DRAWINGS

FIGS. 1A and B are plan and end views, respectively, of a steel pipe to be used for a fork leg prior to working;

FIGS. 2A and B are plan and end views, respectively, of the pipe of FIG. 1 after tapering;

FIGS. 3A and B are plan and end views, respectively, of the pipe of FIG. 2 after collapsing;

FIGS. 4A and B are plan and end views, respectively, of one end of the pipe of FIG. 3 after closing;

FIG. 5 is a plan view of another embodiment of the step shown in FIG. 4;

DETAILED DESCRIPTION OF THE INVENTION

The above-mentioned and other objects and features of the present invention will become apparent from a reading of the following detailed description with reference to the accompanying drawings showing together a preferred embodiment of the present invention, in which FIGS. 1 through 10 are front views of the respective steps according to the present invention.

Figure 6:
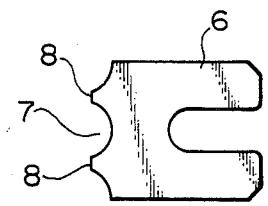
FIG. 6 is a plan view of a fork fitting to be attached to the pipe of FIG. 5.
Figure 7:
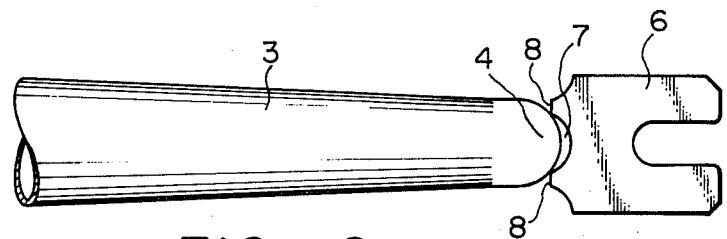
FIG. 7 is a plan view showing the first step in attaching the pipe and the fitting.
Figure 8:
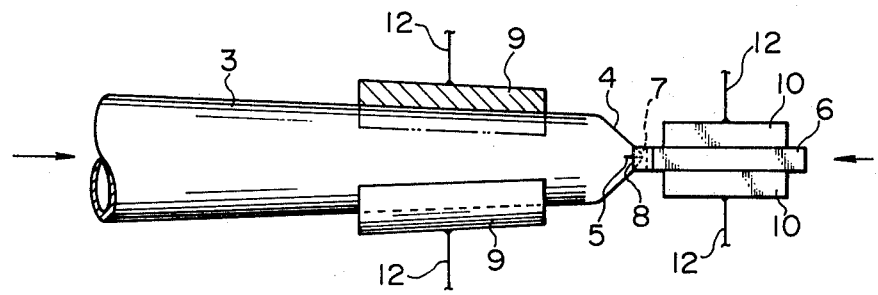
FIG. 8 is an elevational view, partly in cross-section, showing the welding arrangement.

Referring to the drawings, a steel pipe 1 as shown in FIG. 1 is tapered as illustrated in FIG. 2 by swaging, and the thus tapered pipe 2 is collapsed to form a fork leg 3 having an elliptical shape in section. One end 4 of fork 3 is blanked out by pressing into a semi-circular shape as shown in FIG. 4, with its distal end 5 being closed as indicated in FIG. 4 or 5. As shown in FIG. 6, on the other hand, a fitting means 6 is provided on its left-hand end (to be welded) with a semi-circular dent 7 having a radius somewhat smaller than that of the semi-circular portion 4 of the distal end of fork leg 3. The fitting has projections 8 and 8 provided near to both sides of dent 7 and shaped in such a manner that they are capable of coming in contact with the semi-circular portion 4 of fork leg 3 as shown in FIG. 7. The fork leg 3 and the fitting 6 are then set on a welding machine in such a manner that, as shown in FIG. 8, they are retained between two pairs of electrodes 9, 9 and 10, 10 for butt welding while, as shown in FIG. 7, the projections 8 and 8 of fitting 6 are in contact with the semi-circular portion 4 of fork leg 3. It should be noted that wiring between the fork leg 3 or the fitting 6 between a pair of electrodes 9, 9 or 10, 10 is applied in such a manner that, upon intersecting at said two contact points, electric currents flow in the symmetrically reverse directions.

Figure 9:
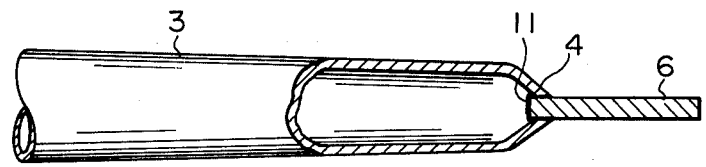
FIG. 9 is an elevational view, partly in cross-section, showing the assembly after welding.
Figure 10:
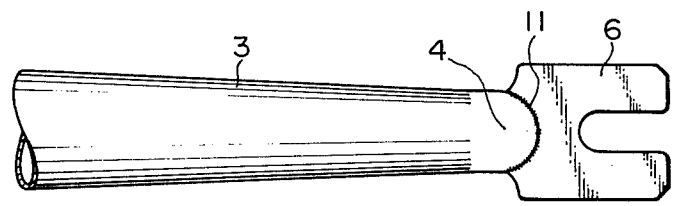
FIG. 10 is a plan view showing the assembly after welding.

A pressure is pre-applied to the thus constructed arrangement by any suitable pressurizing means followed by energization, leading to the generation of heat through contact resistance and resistivity. When the portion to be welded reaches a temperature suitable for welding, a greater pressure is applied by said means to upset the arrangement. Thereafter, as shown in FIGS. 9 and 10, welding is carried out in a state where the fitting 6 is forced at its left-hand side into the distal semi-circular portion 4 of fork leg 3.

In the present invention, the shape of the distal end of the fork leg is not critical. The distal end of the fork leg may also be blanked out into the form of a triangle or perpendicularly to the axis thereof, on condition that it is closed with a joint, and that projections are provided on both ends of the side of the fitting means to be welded.

In the drawings, reference numeral 11 stands for the welded joint.

According to the foregoing embodiment, the action and effect of the present invention are as follows. (A) Of the steps according to the present invention, the steps for forming the fork leg out of a steel pipe are the same as those applied in the prior art. In the present invention, however, the fork leg is blanked out at its distal end to take on a semi-circular shape while, unlike the prior art one leg piece fitting, the fitting is provided with projections at portions near to both ends of the left-hand side. Therefore, welding can surely be effected since the distal end of the fork leg comes in contact with the side of the fitting to be welded at at least two points, resulting in an increase in stability during pressurizing, unlike the prior art one leg piece fitting. Furthermore, the projections play an important role in that they are welded from their portions in contact with the leg. This assures uniform welding over the given portions with no fear of local welding, thus making considerable improvements in the strength of the welded portions. (B) In the present invention, such laborious steps as grooving, deburring, insertion of the fitting, flux treatment and the like are dispensed with as compared with the prior art. Thus, assembling can be attained only with the use of a welding machine, resulting in considerable simplification of the steps involved. This makes automation and mass-production possible, and helps save energy, labor, and cost. (C) With the prior art making use of brazing, there is a possibility that the distal end of the fork leg may bend into a dogleg shape during curving due to a decrease in the strength of the fork leg caused by heating it to a temperature of about 900° C. In the present invention, however, it is possible to prevent a lowering of the strength of the fork leg due to heating, since electric currents are permitted to pass for only a short period of time so that there is no appreciable influence of heat. The above-mentioned automation and mass-production assure uniform quality of the product, and reduce additional energy losses and hence help save energy and labor. (D) The arrangement, wherein, as previously discussed, electric currents are permitted to intersect at the contact points of the fork and fitting sides and flow in the symmetrically reverse directions, enables welding to be uniformly carried out with no possibility that a local current flow is caused. This leads to further increases in strength. (E) In the present invention, the distal end of the fork leg is closed by punching as shown in FIG. 5. As shown in FIG. 8, the fork leg is welded under pressure to the fitting. Therefore, the fitting is forced and retained in the joint of the leg's distal end followed by welding. This also results in further increase in the strength of the welded portion.

While the attachment of the front fitting to the front fork leg has been described in the embodiment, it will be understood that the rear fitting can be mounted on the back fork member in a similar manner.

What is claimed is:

1. A method for attaching a bicycle fork fitting to a fork leg comprising the steps of forming a steel pipe into a fork leg, closing the distal end of the pipe with a joint by shearing, providing a fork fitting with an indentation and a pair of projections on either side thereof at the distal end of said fitting, said indentation being the same shape as the closed distal end of said pipe but slightly smaller in its transverse dimension, butting said projections against said closed distal end of said pipe, applying two pairs of welding electrodes to said pipe and said fitting, passing electric currents by means of said electrodes through the closed portion of the fork leg and the projections of the fitting while bringing the same in contact with each other under pressure, and upsetting under greater pressure the thus integrated arrangement upon reaching a temperature suitable for welding, whereby the fitting is welded to the fork leg.

2. A method as recited in claim 1, in which said closed distal end of the fork leg is in the form of a semi-circular shape.

3. A method as recited in claim 1, in which said closed distal end of the fork leg is in the form of a triangle.

4. A method as recited in claim 1, in which said distal end of the fork leg is blanked out by pressure perpendicularly to the axis thereof.

* * * * *